(12) United States Patent
Rojas-Cessa et al.

(10) Patent No.: US 7,843,908 B2
(45) Date of Patent: Nov. 30, 2010

(54) SCALABLE TWO-STAGE CLOS-NETWORKING SWITCH AND MODULE-FIRST MATCHING

(76) Inventors: Roberto Rojas-Cessa, 936 70th St., 1st Floor, Brooklyn, NY (US) 11228; Chuan-Bi Lin, 654 Elm St., Apt. C-1, Kearny, NJ (US) 07032

( * ) Notice: Subject to any disclaimer, the term of this patent is extended or adjusted under 35 U.S.C. 154(b) by 168 days.

(21) Appl. No.: 12/134,824

(22) Filed: Jun. 6, 2008

(65) Prior Publication Data
US 2008/0303628 A1 Dec. 11, 2008

Related U.S. Application Data

(60) Provisional application No. 60/933,834, filed on Jun. 8, 2007.

(51) Int. Cl.
*H04Q 11/00* (2006.01)
(52) U.S. Cl. ............. 370/386; 370/388; 370/389; 340/2.22
(58) Field of Classification Search .............. None
See application file for complete search history.

(56) References Cited

U.S. PATENT DOCUMENTS

| | | | |
|---|---|---|---|
| 6,696,917 B1 * | 2/2004 | Heitner et al. | 340/2.22 |
| 2002/0061020 A1 * | 5/2002 | Chao et al. | 370/390 |
| 2005/0152352 A1 | 7/2005 | Jun et al. | |
| 2006/0285548 A1 * | 12/2006 | Hill et al. | 370/416 |

OTHER PUBLICATIONS

C. Clos, "A Study of Nonblocking Switching Networks," *Bell Syst. Tech. J.*, 32:406-424, 1953.

M. G. Hlychyj and M. J. Karol, "Queueing in High-Performance Packet Switching", *IEEE Journal on Selected Areas in Communications*, 6(9):1587-1597, Dec. 1988.

F. M. Chiussi, J. G. Kneuer and V. P. Kumar, "Low-Cost Scalable Switching Solutions for Broadband Networking: The ATLANTA Architecture and Chipset", *IEEE Communications Magazine*, 44-53, Dec. 1997.

J. Turner and N. Yamanaka, "Architectural Choices in Large Scale ATM Switches", *IEICE Transactions in Communications*, E81-B(2):120-137, Feb. 1998.

R. Schoenen, G. Post and G. Sander, "Weighted Arbitration Algorithms with Priorities for Input-Queued Switches with 100% Throughput", *IEEE International Workshop on Broadband Switching Systems*, 1999.

P. Gupta and N. McKeown, "Designing and Implementing A Fast Crossbar Scheduler", *Micro IEEE*, 19(1):20-28, Jan./Feb. 1999.

(Continued)

*Primary Examiner*—Duc C Ho

(57) ABSTRACT

A configuration scheme for IQC switches that hierarchizes the matching process reduces configuration complexity by performing routing first and port matching afterwards in a three-stage Clos-network switch. This scheme applies the reduction concept of Clos networks to the matching process. This, in turn, results in a feasible size of schedulers for up to Exabit-capacity switches, an independent configuration of the middle stage modules from port matches, a reduction of the matching communication overhead between different stages, and a release of the switching function to the last-stage modules in a three-stage switch. The switching performance of the proposed approach using weight-based and weightless selection schemes is high under uniform and non-uniform traffic. The number of stages of a Clos-network switch can be reduced to two.

16 Claims, 11 Drawing Sheets

OTHER PUBLICATIONS

N. McKeown, "The *i*SLIP Scheduling Algorithm for Input-Queued Switches", *IEEE/ACM Transactions on Networking*, 7(2):188-201, Apr. 1999.

N. McKeown, et al., "Achieving 100% Thoroughput in an Input-Queued Switch", *IEEE Transactions on Communications*, 47(8):1260-1267, Aug. 1999.

C-S Chang, W-J Chen and H-Y Huang, "Birkhoff-von Neumann Input Buffered Crossbar Switches", Proc. *IEEE Infocom 2000*, 1614-1623, 2000.

C-S Chang, D-S Lee and Y-S Jou, "Load Balanced Birkhoff-von Neumann Switches", *Proc. IEEE HPSR 2001*, 324-329, May 2001.

R. Rojas-Cessa, et al., "CIXB-1: Combined Input-One-cell-Crosspoint Buffered Switch", *Proc. IEEE HPSR 2001*, 324-329, May 2001.

K. Pun and M. Hamdi, "Static Round-Robin Dispatching Schemes for Clos-Network Switches", *Proc. 2002 IEEE Conf. HPSR*, 329-222, 2002.

T. T. Lee and S. Y. Liew, "Parallel Routing Algorithms in Benes-Clos Networks", *IEEE Transactions on Communications*, 50(11):1841-1847, Nov. 2002.

K. Pun and M. Hamdi, "Distro: A Distributed Static Round-Robin Scheduling Algorithm for Bufferless Clos-Network Switches", *IEEE Globecom*, 2298-2302, Nov. 2002.

E. Oki, et al., "Concurrent Round-Robin-Based Dispatching Schemes for Clos-Network Switches", *IEEE/ACM Transactions on Networking*, 10(6): 830-844, Dec. 2002.

H. J. Chao, S. Y. Liew and Z. Jing, "A Dual-Level Matching Algorithm for 3-Stage Clos-Network Packet Switches", *Proc. 11<sup>th</sup> HOTI*, 2003.

H. J. Chao, Z. Jing and S. Y. Liew, "Matching Algorithms for Three-Stage Bufferless Clos Network Switches", *Communications Magazine, IEEE*, 41(10):46-53, Oct. 2003.

R. Rojas-Cessa, E. Oki and H. J. Chao, "Maximum Weight Matching Dispatching Scheme in Buffered Clos-Network Packet Switches", *2004 IEEE International Conference on Communications*, 2:1075-1079, Jun. 20-24, 2004.

C-B Lin and R. Rojas-Cessa, "Captured-Frame Eligibility and Round-Robin Matching for Input-Queued Packet Switches", *2004 IEEE Communications Letters*, 8(9):585-587, Sep. 2004.

C-B Lin and R. Rojas-Cessa, "Frame Occupancy-Based Dispaching Schemes for Buffered Three-stage Clos-Network Switches", *13<sup>th</sup> IEEE International Conference on Networks*, 2005, 771-775, Nov. 2005.

International Search Report and Written Opinion for PCT/US2008/066133 mailed Oct. 7, 2008.

Chuan-Bi Lin et al., "Module Matching Schemes for Input-Queued Clos-Network Packet Switches", *IEEE Communications Letters, IEEE Service Center*, Piscataway, NJ, vol. 11, No. 2, Feb. 1, 2007, pp. 194-196.

Jajszczyk A., Nonblocking, Repackable, and Rearrangeable Clos Networks: Fifty Years of the Theory Evolution, *IEEE Communications Magazine, IEEE Service Center*, Piscataway, US, vol. 41, No. 10, Oct. 1, 2003, pp. 28-33.

International Preliminary Report on Patentability for PCT/US2008/066133, mailed Dec. 23, 2009.

\* cited by examiner a)

SCALABLE TWO-STAGE CLOS-NETWORKING SWITCH AND MODULE-FIRST MATCHING

CROSS-REFERENCE TO RELATED APPLICATIONS

The present application claims priority to U.S. Provisional Application No. 60/933,834 entitled "Method and System for Configuring an Input-Queued Clos-Network Internet Switch Using Module Matching" filed on Jun. 8, 2007, and incorporated herein by reference.

STATEMENT OF FEDERALLY FUNDED RESEARCH

The present application includes research supported in part by the National Science Foundation (NSF) under Grant No. 0435250. The federal government may have certain rights in the present application.

FIELD

The present disclosure relates to communication over data networks and the use of switches and routers in this communication. Switches are necessary to forward data towards its destination over networks, such as the internet. Clos-network switches are proposed as a scalable architecture for the implementation of large-capacity circuit switches. The proposed disclosure allows for a more practical implementation configuration to remedy this concern.

BACKGROUND

The three-stage Clos-network switch uses small switches as modules in each stage to build a switch with a large number of ports and therefore requires less hardware than that of a single-stage switch of the same size. Each of these modules can be a crossbar switch. Input-queued Clos-network (IQC) switches have queues in the input ports to store cells (variable-length packets are segmented into fixed-length packets, called cells, for internal switching) in case of input or output contention. The configuration of these switches is complex as output contention and path routing need to be resolved for every time slot before the transmission of packets occur. Although Clos-network switches reduce the hardware amount in terms of the number of crosspoints, the module size, and the number of modules required to implement high-capacity packet switches, there are other issues that can limit their scalability Some of the issues that can limit the scalability of these switches are as follows. First, the time for configuring all modules before a packet is sent through the switch. This time requires a fast packet scheduler and an efficient exchange of scheduling information among the arbiters. Second, the number of ports (N), as a large N would require large-size hardware arbiters. For example, a switch with N=1024, using a scheduler with an implementation complexity of $O(N^2)$ and a time complexity of $O(\log N)$, would be difficult to build.

One strategy that simplifies the configuration complexity of Clos-network switches is the use of queues in the first- and third-stage modules. In this way, the scheduling of packets becomes a dispatching scheme issue. However, the queues in the first-stage modules need to work with a speedup of n+1 and those in the third-stage modules need to work with a speedup of m+1, where n is the number of input ports of the first-stage modules, and m is the number of second-stage modules. This makes it complex to build queued Clos-networks switches. Therefore, IQ Clos-network switches with bufferless switch modules seem to be a good alternative for large scale switches.

Considering that IQ Clos-network switches have no memory in any stage, except in the input ports, the switch modules are simple to design. An IQ Clos-network switch needs no memory speedup in the switch modules and is free of out-of-sequence forwarding that may occur in buffered Clos-network switches. As the input ports have virtual output queues (VOQs), where one queue per output port is allocated to store cells for that output, the IQ Clos-network switch avoids the head-of-line (HOL) blocking problem.

Various matching schemes to configure IQC switches have been proposed. Many of these schemes solve the configuration process in two phases: port matching first and routing thereafter, as routing uses the results of the port matching phase. The matching schemes based on port matching can be complex and time consuming. For instance, in a 1024×1024 switch these schemes require a scheduler able to simultaneously match 1024 input ports to 1024 output ports. However, a scheduler of that size may be complex to implement.

SUMMARY

At least one described embodiment proposes a two-stage switch, as a solution for very-large scale switches. The configuration of this novel two-stage switch is based on our proposed module-first matching scheme that considers a three-stage Clos-network switch as reference. The configuration process of three-stage IQ Clos-network switches is simplified by applying a matching process which reduces the hardware complexity of large scale switches. Matching is performed between modules in the first and third stages in the first phase, and matching between input and output ports of those matched modules, afterwards. This approach is referred to as module-first matching (MoM). Longest queue-occupancy first selection is used as a weighted scheme to estimate the switching performance when using this simple configuration approach. This combination of a weighted selection scheme with MoM is called WMoM. MoM reduces the matching size of IQ Clos-network switches, such that small schedulers can be used for very large scale switch, of up to Exabit capacity.

Thus, a switch with 1024 ports, and n=m=k=32, the largest matching size performed by MoM is 32 instead of 1024, and a fast 32×32 scheduler is feasible to implement. Module matching is used to determine the configuration of the second-stage modules and port matching for the configuration of the first-stage modules. With the configuration of the first and second stage modules, the third stage-modules become needless and the architecture becomes a two-stage switch. Furthermore, MoM can provide high throughput under several traffic models despite its simplicity.

BRIEF DESCRIPTION OF THE DRAWINGS

To assist those of ordinary skill in the relevant art in making and using the subject matter hereof, reference is made to the appended drawings, wherein.

DETAILED DESCRIPTION

In disclosed embodiments of the present application, the scheduler complexity for IQC switches is simplified by applying a concept of hardware complexity reduction of large switches in Clos networks to the configuration process. The embodiments perform matching between first- and third-stage modules first, and matching between the input and output ports of matched modules afterward. This hierarchical approach can be referred to as module-first matching (MoM). The longest input queue-occupancy first selection is used as a weight-based MoM (WMOM) selection to show the switching performance when using this simple configuration approach. The switching performance of WMoM to weight-less MoM schemes based on round-robin and random selections are compared. MoM simplifies the configuration of IQC switches. For switches with a large number of ports, say 1024, and n=m=k=32, where k is the number of first- and third-stage modules, MoM can use a scheduler size of 32 instead of 1024, and a fast 32×32 scheduler is feasible to implement. Also, MoM can provide high throughput under several traffic models despite its simplicity.

Figure 1A:
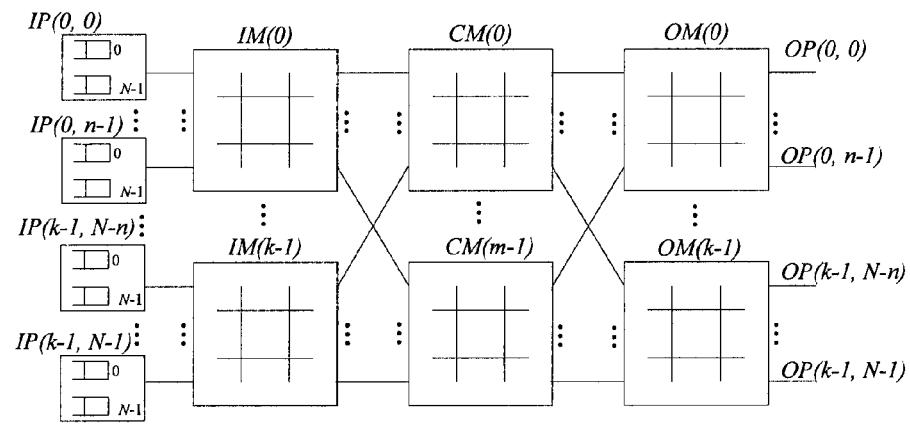
FIG. 1a is a diagram representing a 3-stage Clos-network switch.

The three-stage 1Q Clos-network switch uses virtual output queues (VOQs) in the input ports, as FIG. 1a shows. To facilitate description of embodiments, the following terminology is used:

IM(i): (i+1)th input module, where $0 \leq i \leq k-1$.
CM(i): (r+1)th central module, where $0 \leq r \leq m-1$.
OM(i): (j+1)th output module, where $0 \leq j \leq k-1$.
n: number of input/output ports in each IM/OM, respectively.
k: number of IMs/OMs.
m: number of CMs.
IP(i, g): (g+1)th input port (IP) at IM(i), where $0 \leq g \leq n-1$.
OP(j, h): (h+1)th output port (OP) at IM(j), where $0 \leq h \leq n-1$.
VOQ(i, g, j, h): Virtual output queue at IP(i, g) that destined for OP(j, h).

There are k input modules (IM), m central modules (CM), and k output modules (OM) in the switch. IMs have dimension of n×m, OMs have a dimension of m×n, and CMs have a dimension of k×k. The input ports at IM(i) are denoted as IP(i, g). The output ports of OM(j) are denoted as OP(j, h). Each IP(i, g) has N=n×k VOQs to avoid head-of-line (HOL) blocking. A VOQ(i, g, j, h) stores cells going from IP(i, g) to OP(j, h).

Figure 1B:
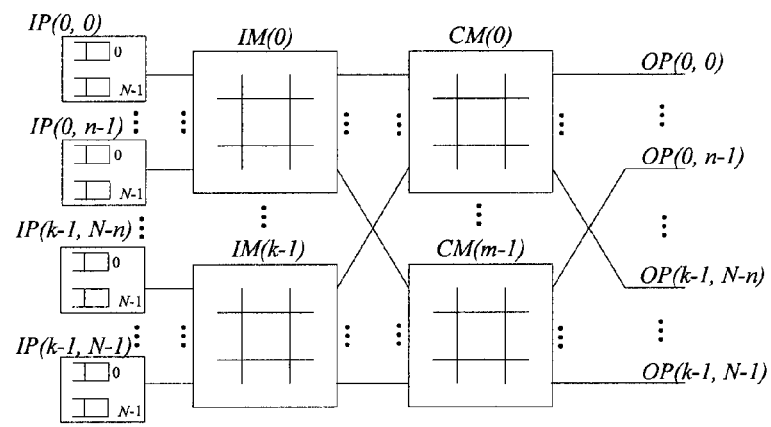
FIG. 1b is a diagram representing a 2-stage Clos-network switch.

FIG. 1b shows an example two-stage Clos-network switch, using the same notation of the three-stage switch. However, since the third stage is removed, the OMs are not used. For the sake of description, the CM labels are used as in the three-stage switch, although it is clear that they could be renamed as OMs. This architecture can be referred to as two-stage Clos-network switch, as it can be derived from the original three-stage Clos-network.

MoM with a weight-based selection scheme is described as an example. Other selection schemes can be used by following the described process. The MoM scheme uses two classes of schedulers for matching: the module matching scheduler, $S_M$, which determines the matched IM(i)-OM(j) pairs, and the port matching scheduler, $S_P$, which determines the matched VOQ(i, g, j, h)-OP(j, h) pairs after the IM-OM pairs are defined. Weight-based MoM (WMoM) uses longest queue-occupancy first as the selection policy, which is similar to the iLQF algorithm for single-stage switches. However, WMoM considers the occupancy of all ports in an IM for module matching.

To determine the weights for the IM(i)-OM(j) matching a VOQ module counter (VMC) is used to store the number of cells in IM(i) going to OM(j). A VMC is denoted as VMC(i,j). The VOQ(i, g, j, h)-OP(j, h) matching is performed after module matching. Each of the matching processes follows a request-grant-accept approach. Generally, WMoM performs r iterations of the complete scheme (e.g., module matching is executed r times, where $r \leq 1$), and q iterations for module and port matching (e.g., module matching executes q iterations, where $1 \leq q \leq k$).

The following is a description of an example WMoM embodiment:

First Iteration of WMoM (r=1)
Part 1: Module Matching: First Iteration
First Iteration of Module Matching:

Step 1 (request). Each VMC whose count is larger than zero sends a request to the destined output module arbiter at the $S_M$. Requests include the number of cells for an output module.

Step 2 (grant). If an unmatched output module arbiter at the $S_M$ receives any requests, it chooses the one with the largest occupancy. Ties are broken arbitrarily.

Step 3 (accept). If an unmatched input module arbiter at the $S_M$ receives one or more grants, it accepts the one with the largest occupancy. Ties are broken arbitrarily.

qth Iteration of Module Matching

Step 1: Each unmatched VMC sends a request to all unmatched output module arbiters at the $S_M$, as in the first iteration.

Steps 2 and 3: The same procedure is performed as in the first iteration among unmatched VMCs and unmatched output module arbiters.

Part 2: Port Matching

After Part 1 is complete, port matching is performed between those ports of the matched IMs and OMs.

First Iteration of Port Matching

Step 1 (Request): Each nonempty VOQ of the matched IM(i) sends a request to each output arbiter in $S_P$ for the matched OM(j) for which it has a queued cell, indicating the number of cells in that VOQ.

Steps 2 (grant) and 3 (accept): The same procedure as in the module matching is performed for matching nonempty VOQs of a matched IM(i) and OPs of a matched OM(j). This matching is performed by input port arbiters and output port arbiters in Sps. These output and input arbiters select requests and grants, respectively, with the largest occupancy selection policy. Ties are broken arbitrarily.

qth Iteration of Port Matching

Step 1: All unmatched VOQs in IM(i) at the previous iterations send another request to corresponding unmatched OPs in the matched OM(j) as in Step 1 of the first iteration.

Steps 2 and 3: The same procedure is performed as in the first iteration for matching between unmatched nonempty VOQs and unmatched output ports in the matched IM(i)-OM (j) pairs. Count the cumulative number of matched ports per IM and OM at this time slot. The number of matched ports is smaller than or equal to n.

For r>1, the number of matched ports determines the number of central modules that are used to transfer cells from IM(i) to C(r) and from C(r) to OM(j). The selection of modules is performed by selecting those available CMs with the smaller index. For r=1, all CM paths are configured by using the module match result, which makes all CMs have the same configuration.

rth Iteration of WMoM

Perform Part 1 with those modules that have fewer than n matched ports and whose unmatched ports are non-empty, and Part 2 with the non-empty unmatched ports of the modules matched at the current iteration.

Figure 2:
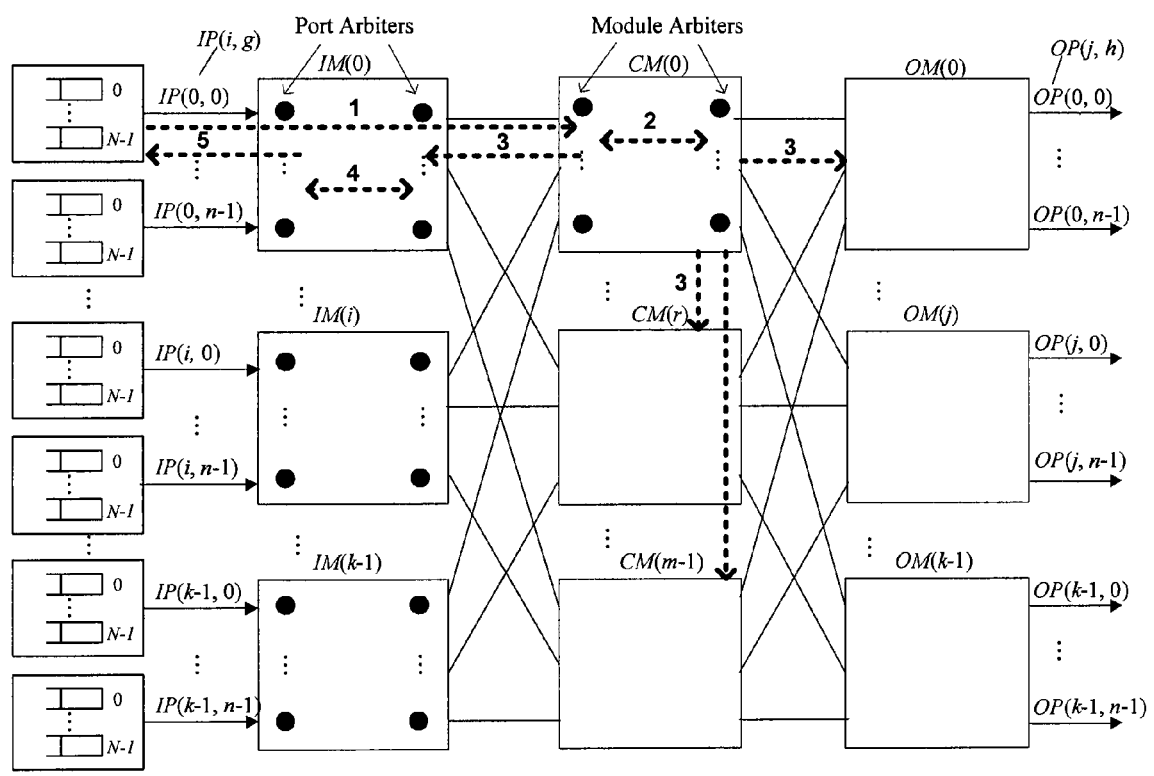
FIG. 2 is a diagram depicting an example input-queued Clos network switch architecture.

One objective of MoM is to provide a feasible solution for performing the matching processes used to configure an IQ Clos-network switch. For this, the IMs and OMs are first matched, and a module scheduler is used that performs a k×k matching and, therefore, the module scheduler N has k input arbiters and k output arbiters. Since k=N/n, the size of the scheduler can be small. The same is the case for the scheduler that performs matching for the input ports of the matched IM to the output ports of the matched OM, called port scheduler. This scheduler performs a n×n matching, and therefore, it has n input arbiters and n output arbiters. There is one port scheduler in each IM and there is only one module scheduler that can be placed in one of the CMs, where IMs' requests would converge, in a distributed implementation of MoM. FIG. 2 shows the port and module arbiters as small circles in IMs and in a CM, respectively. A centralized implementation can also be considered because of the small size of the schedulers.

Operations performed in an example MoM process with r=1 (or in one iteration) can be as follows: 1) the inputs send a request to the module scheduler, 2) the module scheduler performs module matching with q iterations, 3) the module scheduler sends the grants to port schedulers at IMs, 4) the port schedulers at IMs perform matching with any number of iterations, and 5) the port schedulers send a grant to the input ports. FIG. 2 shows these operations with dashed arrows as seen by an input port. The processes are indicated with numbers over the arrows, and the arrows indicate in what direction the information flows. A bidirectional arrow represents an iterative matching process.

Because an IM is only matched to a single OM, then all CMs have the same configuration at a given time slot. Therefore, the information coming from the module scheduler to all CMs is the same.

Figure 3:
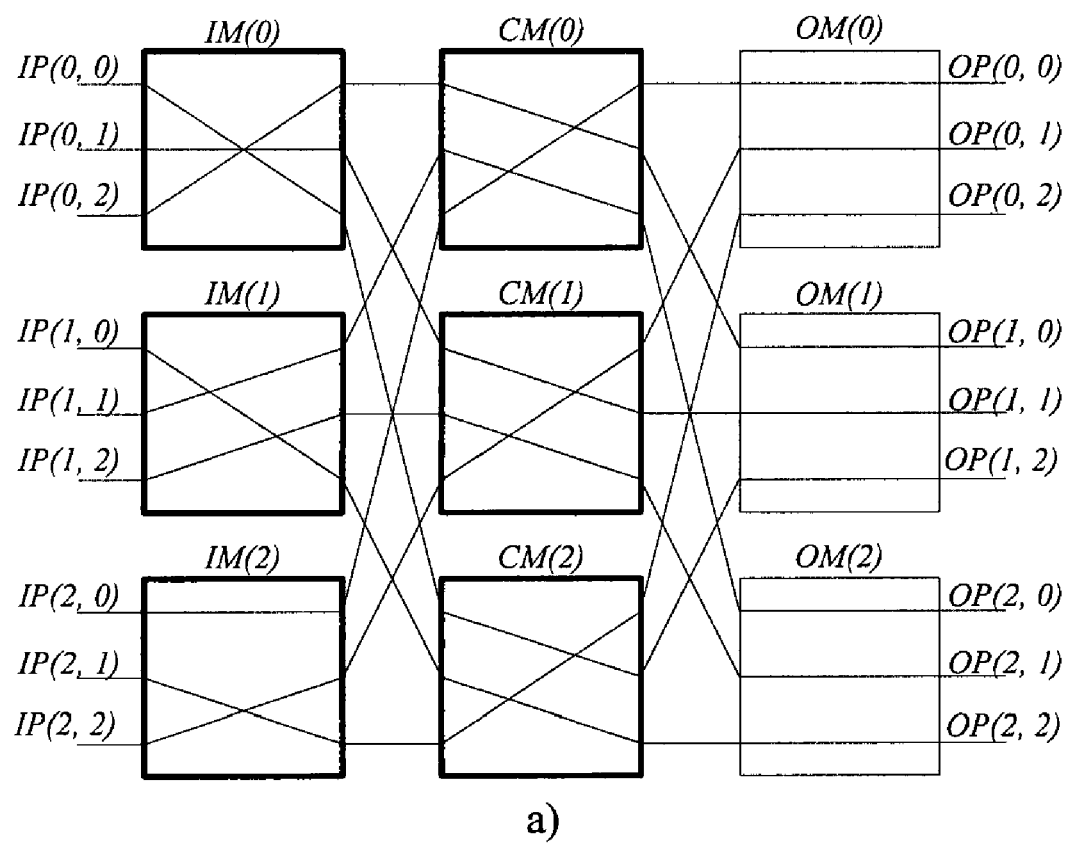
FIG. 3 is an example configuration of central modules.

FIG. 3 shows an example of configurations of a 9×9 three-stage Clos-network switch after the MoM process. All CMs use the same configuration obtained through module matching. In this example, IM(0) is matched to OM(1), IM(1) is matched to OM(2), and IM(2) is matched to OM(1). In IM(0), IP(0, 0) is matched to OP(1, 2), IP(0, 1) is matched to OP(1, 1), and IP(0, 2) is matched to OP(1, 0). Because port matching involves only those IM-CM pairs, the configuration for such match can be done at the IMs only. As shown in this example, OMs use the same configuration (no reconfiguration independently of the matching result), and therefore switching is not performed by them. Therefore, the three-stage switch used in the matching process is only a reference, and a two-stage Clos-network switch (whose modules are indicated by a bold line) suffices. The module and port arbiters might have counters to retain the number of cells in an input and VOQs. In this way, a single request can be sent from each VOQ to the schedulers.

Performance evaluations are produced through computer simulation, including a simulation with WMoM having multiple iterations when a number of iterations of min {a, b}, where a and b is the number of the bipartite members in the matching (e.g., the number of ports or modules). To analyze the effect of the adopted selection scheme, the performance of WMoM is examined with the same number of iterations for module matching and port matching. In FIGS. 4-8, a symmetric Clos-network switch with n=m=k=8 and the number of iterations, denoted as Itr, equal to 1, 4, and 8 is studied. These values are selected as the adopted matching scheme delivers the lowest performance with Itr=1 and the highest performance with Itr=8, which is equal to n. The traffic models considered have destinations with uniform and nonuniform distributions and Bernoulli and bursty arrivals.

Figure 4:
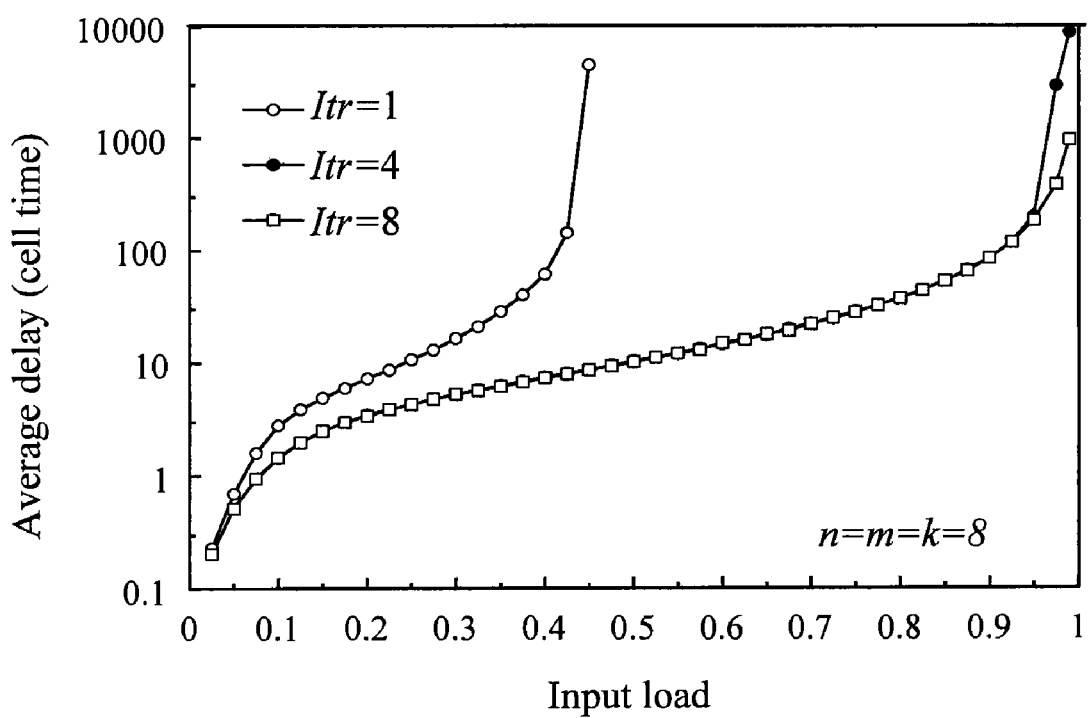
FIG. 4 is a graph of simulation results under uniform traffic with Bernoulli arrivals.
Figure 5:
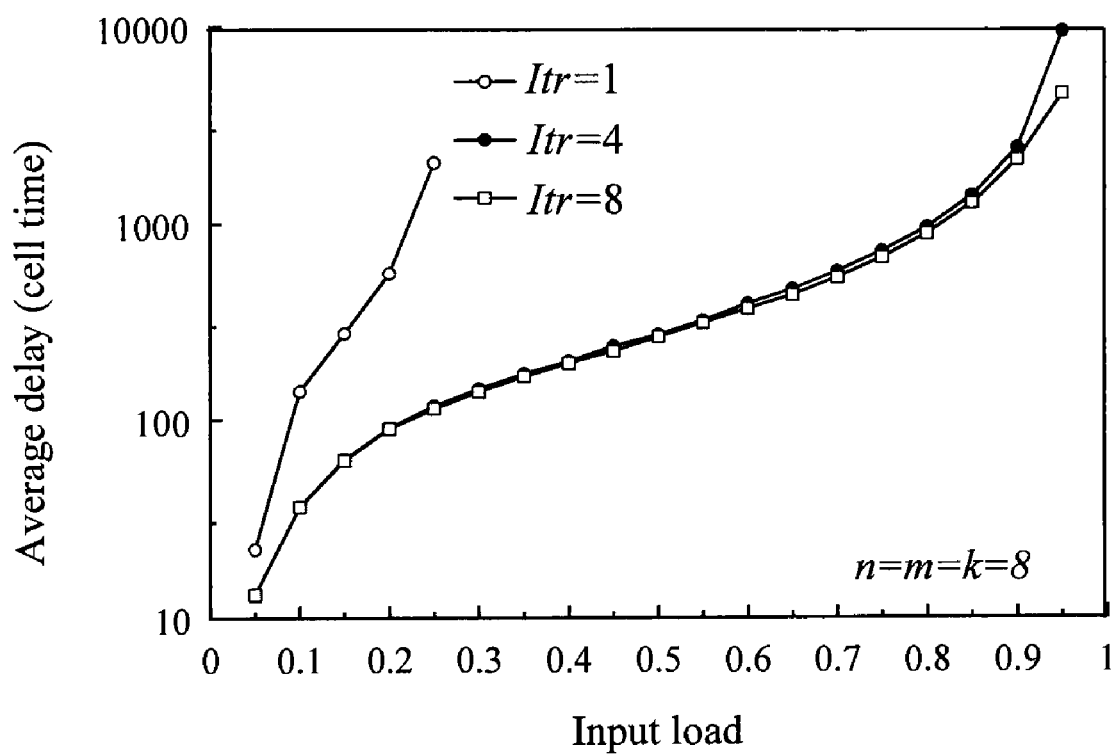
FIG. 5 is a graph of simulation results under bursty uniform traffic.

FIG. 4 shows the simulation results of an example WMoM with single and multiple iterations for WMoM under uniform traffic with Bernoulli arrivals. This figure shows that the example WMoM has a low throughput when both the module matching and port matching processes perform a single iteration. As the number of iterations increases, the throughput of WMoM also increases. The graph shows that WMoM can deliver 100% throughput with Itr=8 under Bernoulli uniform traffic. The bursty traffic follows an on-off Markov modulated process, where the average burst length l is set to 16 cells. FIG. 5 shows that the example WMoM provides low throughput with a single iteration, and above 96% throughput for Itr=4 and Itr=8 under bursty uniform traffic. To improve the throughput under this traffic model, a round-robin selection scheme can be used.

Figure 6:
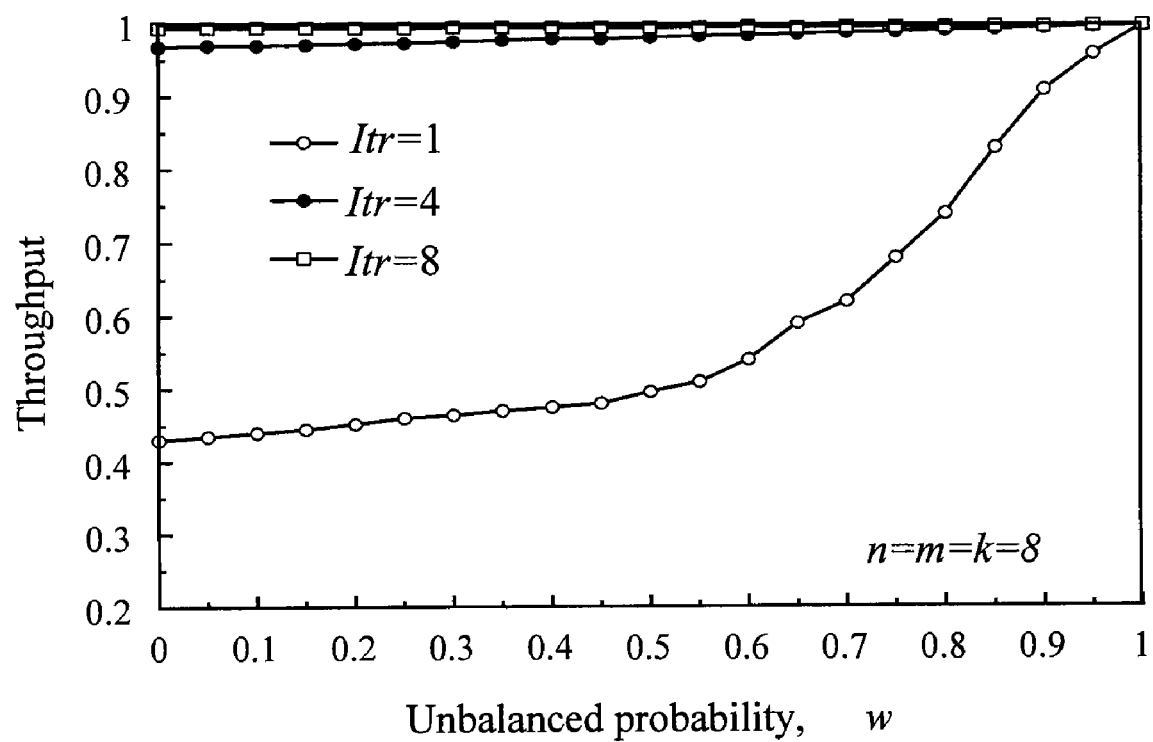
FIG. 6 is a graph of simulation results under unbalanced traffic.

The WMoM scheme was simulated with multiple iterations under three different nonuniform traffic patterns: unbalanced, asymmetric and diagonal. The unbalanced traffic model uses a probability, ω, as the fraction of input load directed to a single predetermined output, while the rest of the input load is directed to all outputs with uniform distribution. The traffic load from IPs to OPd, $\rho_{s,d}$ is given by:

$$\rho_{s,d} = \begin{cases} \rho\left(\omega + \dfrac{1-\omega}{N}\right) & \text{if } s = d \\ \rho\dfrac{1-\omega}{N} & \text{otherwise} \end{cases} \quad (1)$$

Where N (i.e., nk) is the switch size. When ω=0, the offered traffic is uniform. On the other hand, when ω=1, the traffic is completely directional. This means that all traffic of IPs is destined for OPd, where s=d. FIG. 6 shows the throughput performance of WMoM under unbalanced traffic. This graph of FIG. 6 shows that WMoM has low throughput with 1 iteration. When the number of iterations increases, the throughput of WMoM increases under the complete range of ω. FIG. 5 also shows that WMoM has above 97% throughput with 4 iterations and achieves above 99% with 8 iterations. One reason for the improvement shown by WMoM is that n iterations guarantee that n ports are matched, if there is a cell destined to them, as has been observed on single-stage switches.

Figure 7:
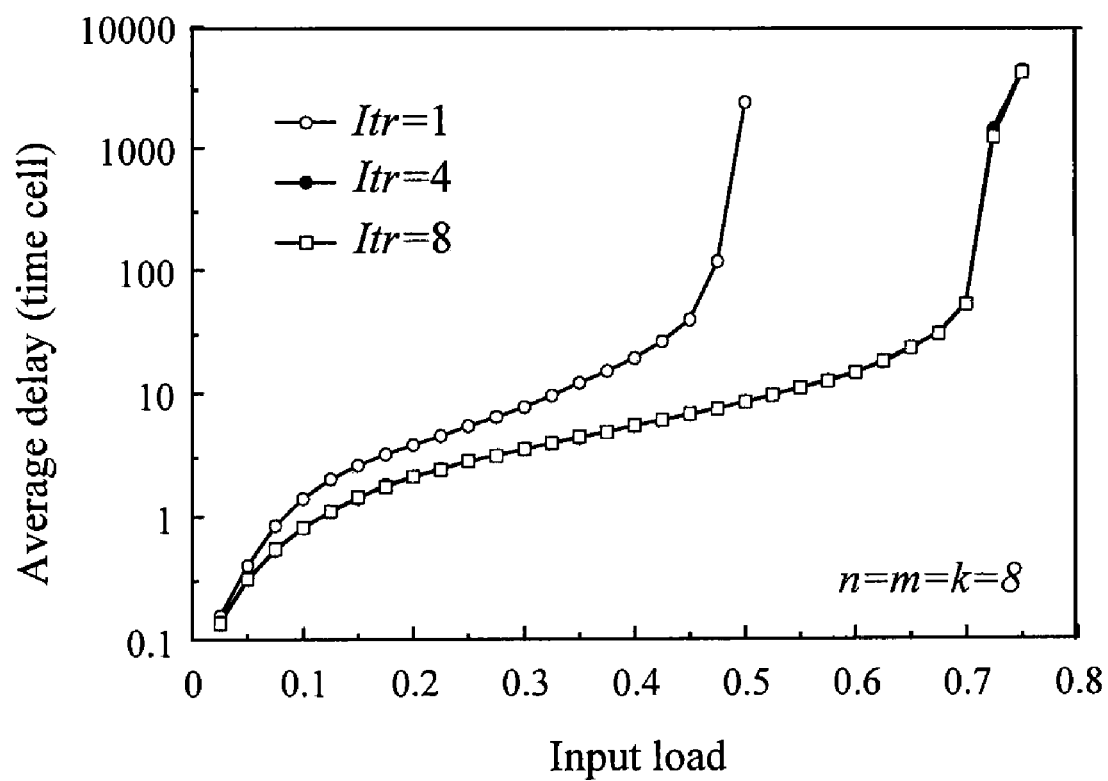
FIG. 7 is a graph of simulation results under asymmetric traffic.

Another non-uniform traffic pattern is Chang's traffic model, which is defined as $\rho_{i,j}$ when i=j, and $\rho_{i,j}=1/(N-1)$, otherwise, where N=nk and $\rho_{i,j}$ is the input load. Although the performance graph is not shown, the WMoM scheme using Chang's traffic model delivers similar performance, in terms of throughput and delay, as that for uniform traffic. This traffic model has a different distribution of the input load for each output port. FIG. 7 shows that WMoM delivers low throughput, even with multiple iterations, under asymmetric traffic, as the throughput barely reaches 75% with Itr=8.

Figure 8:
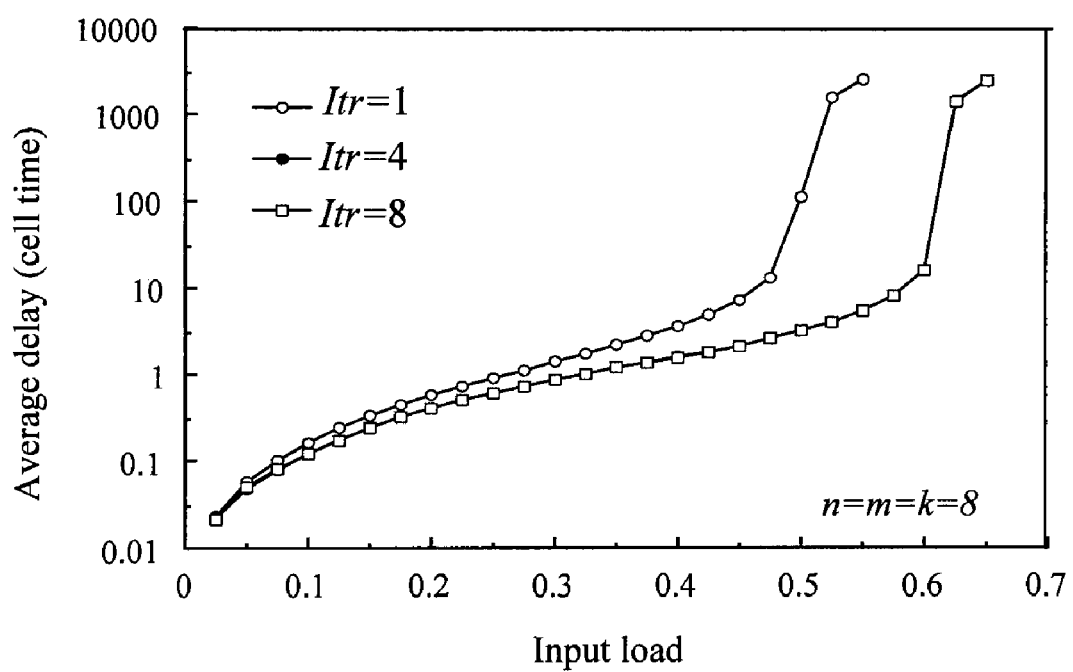
FIG. 8 is a graph of simulation results under diagonal traffic.

WMoM was also tested under the diagonal traffic model, which is defined here as $\rho_{i,j}=\frac{2}{3}$ when j=i, $\rho_{i,j}=\frac{1}{3}$ when j=(i+1)mod N, and $\rho_{i,j}=0$ otherwise. FIG. 8 shows that WMoM has lower throughput than that obtained under asymmetric traffic as this traffic model has a strong nonuniform distribution among only two output ports per input. One approach that can be used to improve the throughput of this switch is by applying framed matching schemes.

The reduction of scheduler sizes by module matching allows the implementation of large switches. Two different strategies are considered: a) with n=m=k, and b) with a more flexible selection of n and m values. Table 1 shows an example of the component size for switches with n=m=k. Here, the size of the IMs/OMs and CMs are denoted as |IM| and |OM|, respectively. The number of module schedulers, denoted as MS, is always one, and the number of port schedulers, denoted as PS, is k. The sizes of the module and port schedulers are denoted as |MS| and |PS|, respectively. Table 2 shows an example of scheduler sizes in a switch with flexible configuration.

TABLE 1

| N | n = m = k | |IM| = |CM| | PSs | |MS| | |PS| |
|---|---|---|---|---|---|
| 256 | 16 | 16 × 16 | 16 | 16 | 16 |
| 1024 | 32 | 32 × 32 | 32 | 32 | 32 |
| 4096 | 64 | 64 × 64 | 64 | 64 | 64 |
| 16384 | 128 | 128 × 128 | 128 | 128 | 128 |

Here, the maximum matching size is 64 to reduce hardware and time complexities. Since the implementation issues related to cabling and distribution of a large number of chips is out of the scope of this paper, large quantities of such elements are acceptable. For switches with n=m=k, the number of size possibilities is rather reduced, so a more flexible selection of n and m can be used as Table 2 shows.

TABLE 2

| N | n | k | m | MSs | PSs | |MS| | |PS| |
|---|---|---|---|---|---|---|---|
| 256 | 64 | 4 | 4 | 1 | 4 | 4 | 64 |
| 512 | 64 | 8 | 8 | 1 | 8 | 8 | 64 |
| 1024 | 64 | 16 | 16 | 1 | 16 | 16 | 64 |
| 2048 | 64 | 32 | 32 | 1 | 32 | 32 | 64 |
| 4096 | 64 | 64 | 64 | 1 | 64 | 64 | 64 |
| 8192 | 64 | 128 | 128 | 1 | 128 | 128 | 64 |

The information in the table indicates that, the switch size is limited to 4096 ports with a matching size of 64 (i.e., 64×64 schedulers). A larger number of ports increases the size of module schedulers and the CMs, beyond the restricted value in the example. However, the module matching principle can be applied to nested Clos-network switches and used to reduce the CM sizes.

Figure 9:
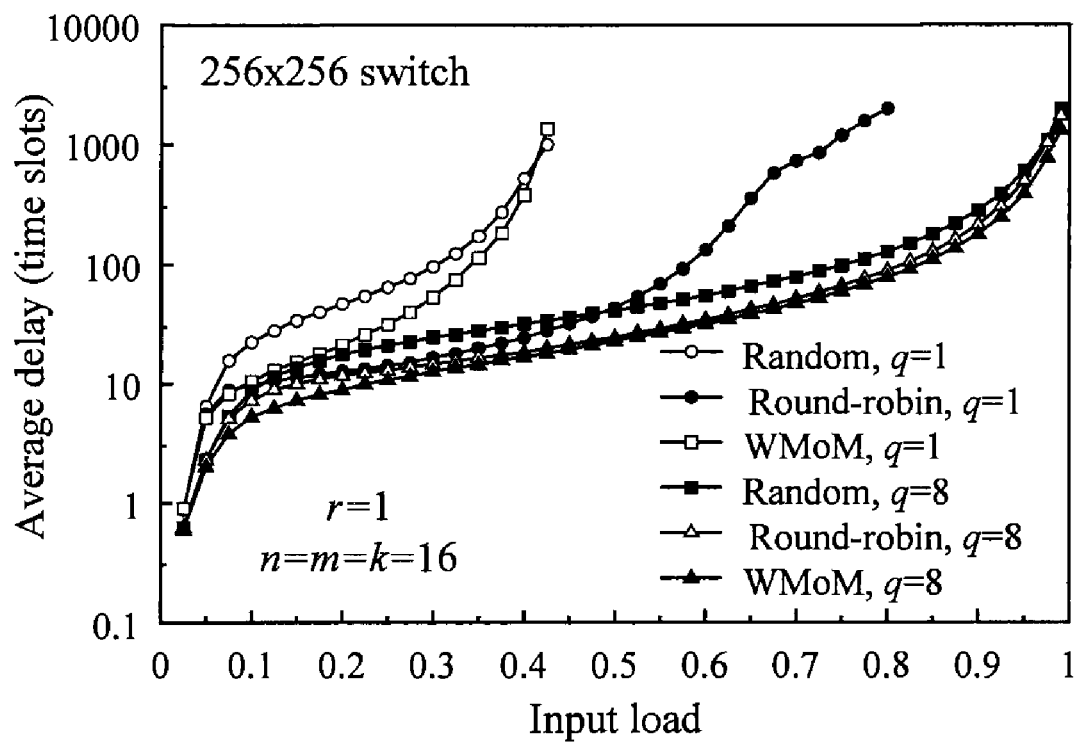
FIG. 9 is a graph of simulation results under Bernoulli uniform traffic in a n=16 switch.
Figure 10:
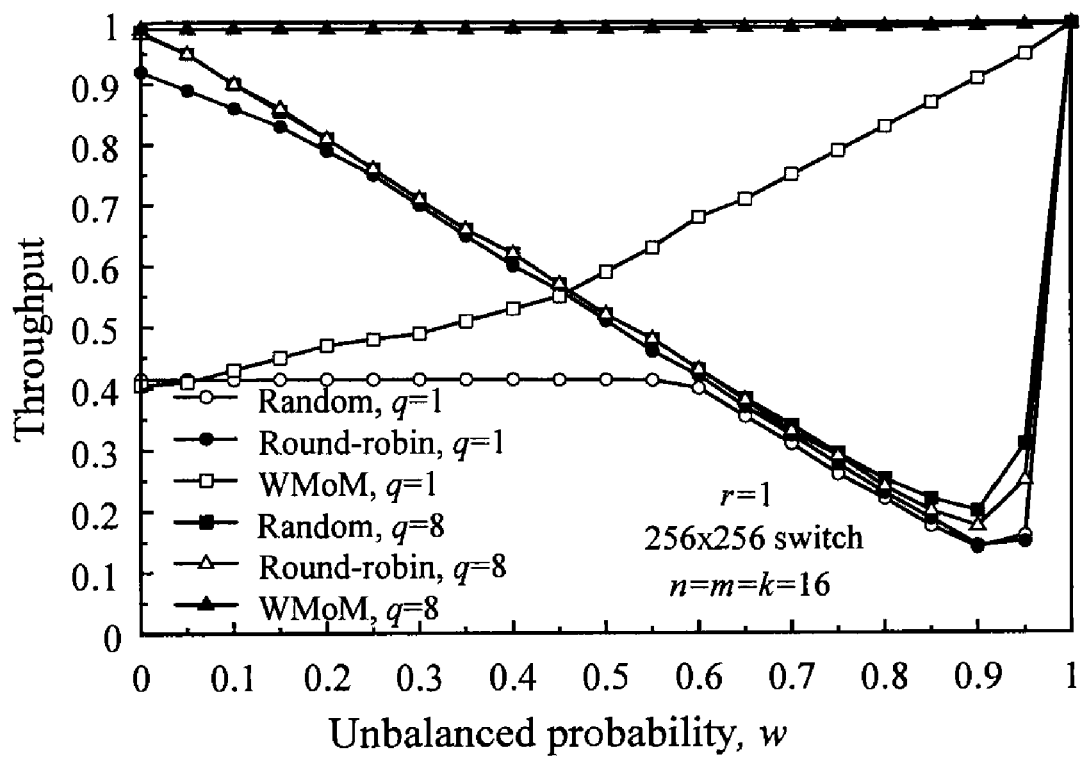
FIG. 10 is a graph of simulation results under Bernoulli unbalanced traffic in a n=16 switch.

In FIGS. 9-10, three MoM schemes were modeled for simulation: WMoM, MoM with round-robin selection, and MoM with random selection to show the performance of weight-based and weightless-based schemes. One simulation used r=1 to show the lowest performance of these MoM schemes, and q={1, 8} for a fair comparison of WMoM and the other two schemes. In the simulation relating to FIGS. 9-10 a 256×256 Clos-network switch with n=m=k=16 is considered. The procedures for the weightless schemes follow the operations described in Section 3, except for the selection scheme of ports and modules. The simulation does not consider the segmentation and re-assembly delays for variable size packets. Again, simulation results were obtained with a 95% confidence interval, not greater than 5% for the average cell delay.

FIG. 9 shows the average cell delay of WMoM under uniform traffic with Bernoulli arrivals. The graph in FIG. 9 shows that WMoM, as the other schemes, has low throughput with q=1. Round-robin delivers the highest throughput with q=1, however, of up to 80%. When q=8 WMoM delivers close to 100% throughput under this traffic model, as the other schemes.

The WMoM was simulated under four different nonuniform traffic patterns: unbalanced, Chang's, asymmetric, and diagonal. FIG. 10 shows the throughput performance of WMoM under unbalanced traffic. The graph of FIG. 10 shows that WMoM delivers 40% throughput, while the other schemes deliver close to 20% throughput (w=0.9) with q=1. When q=8, the throughput of WMoM is close to 100%, while the others remain low. The use of a large q makes WMoM match a larger number of VOQs with high occupancy. The throughputs of the other schemes decrease as w increases because they do not consider the VOQ occupancy in their selection policy, and once modules are matched, the VOQs with large occupancy wait for the following opportunity to send a cell.

Although the graphs are not shown here, the throughput of WMoM is measured with q=8, under Chang's, asymmetric, and diagonal traffic models. WMoM delivers close to 100% throughput under Chang's traffic, 91% throughput under asymmetric, and 87% throughput under diagonal. Furthermore, WMoM is tested with larger r values and noted that the switching performance does not increase significantly under these traffic patterns, making r=1 sufficient in these cases, and therefore, greatly simplifying the configuration of CMs. However, for traffic models with a hot spot distribution, an r=k may be necessary. Also, q=8 is a large number of iterations; however, these are performed in-chip.

Figure 11:
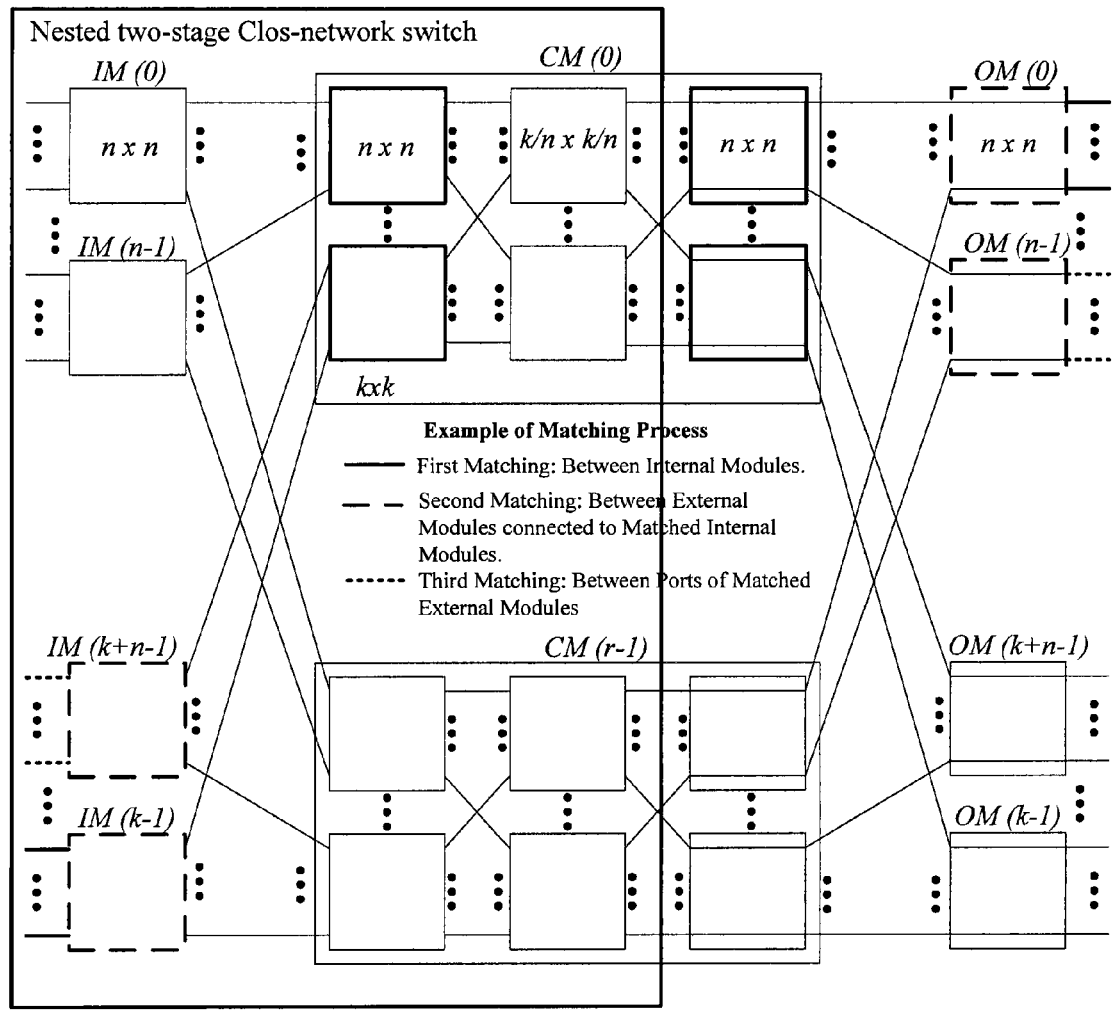
FIG. 11 is a diagram depicting a nested Clos-network switch for large-scale packet switches.

Nested Clos-network switches can be seen as a recursive application of the Clos-network configuration directly into any module (e.g., IM, CM, or OM in a three-stage switch, and IM and CM in a two-stage switch) of a switch. For the sake of simplicity, nesting is applied to CMs, and only two levels are used (i.e., a CM has one Clos-network configuration within and the modules inside are only single-stage switches), as FIG. 11 shows. This figure also shows the order the matching process follows in nested Clos-network switches, first the module matching of the internal modules in CM (modules with bold lines), then the IM-OM modules external to the CMs (modules with bold-dashed lines), and finally the port matching among matched IM-OM pairs (ports with bold-dashed lines) at IM(k−n−1) and OM(n−1). The nested two-stage Clos-network switch is shown by the large rectangle in this figure. Therefore, the architecture of CMs can use a Clos-network configuration.

The scheduler that performs module matching in the internal Clos is denoted as $g_{MS}$, and the size of $g_{MS}$ as $|g_{MS}|$. Here, it can be seen with a restricted scheduler size of 64, the maximum port count is up to 262,144. In a packet switch with 160-Gbps ports, module-first matching would allow to configure a 40 Ebps (Exabit per second) switch, resolved in three phases as indicated above.

The disclosed embodiments describe a two-stage Clos-network switch for scalable IQ Clos-network packet switches. The packet switching fashion allows us to consider the reduction of the original Clos-network switch proposed for circuit switching. The two-stage switch uses a configuration scheme that considers a three-stage Clos-network switch. The proposed scheme uses module-first matching. This scheme matches a single IM to a single OM to reduce the configuration complexity of the switch. Therefore, module matching is performed before port matching, and this is the main the difference from the existing schemes. As an example, a weighted selection scheme is used based on the longest VOQ occupancy to show the performance of this switch under module-matching first. The scheduler complexity for implementing MoM is reduced by applying a matching process which reduces the hardware amount of a large switch. For a large scale switch, of up to Exabit capacity, a small scheduler size can be used.

The disclosed embodiments also show that WMoM, using longest occupancy-queue first provides 100% throughput under Bernoulli uniform traffic for a 64×64 switch, and above 99.5% throughput under Bernoulli unbalanced traffic, respectively. Furthermore, the example embodiments show high and also low performance under other nonuniform traffic patterns. The scheduler and configuration complexities for large-size switches can be reduced to $O(N^{1/2})$, where N is the number of ports. This complexity is smaller than any of the schemes previously proposed. For example, a 1024×1024 match by MoM requires parallel and independent 32×32 schedulers while other schemes require 1024×1024 schedulers.

The applicant has attempted to disclose all embodiments and applications of the disclosed subject matter that could be reasonably foreseen. However, there may be unforeseeable, insubstantial modifications that remain as equivalents. While the present applications have been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

What is claimed is:

1. A method of module-first matching to configure a Clos-Network switch, the method comprising:
    matching first-stage modules and second-stage modules of the Clos-Network switch, wherein the first-stage modules include port arbiters and the second-stage modules include module arbiters, wherein matching the first-stage modules and the second-stage modules includes receiving a request at a destined output module arbiter of a module matching scheduler, and wherein the request includes a number of cells for an output module; and
    matching input and output ports of matched first-stage and second-stage modules of the Clos-network switch.

2. The method of claim 1, further comprising selecting a relay based on longest queue-occupancy first.

3. The method of claim 1, wherein matching first-stage modules and second-stage modules comprises storing the number of cells in the first-stage module going to the second-stage module.

4. The method of claim 3, wherein after module matching, a virtual output queue matching is performed.

5. The method of claim 1, further comprising communicating through the clos-network switch via the matched input and output ports of the matched first-stage and second-stage modules.

6. The method of claim 1, wherein the module matching precedes the port matching.

7. The method of claim 6, wherein the module matching is done by module arbiters that upon matching modules send a grant to port arbiters to match ports.

8. The method of claim 7, wherein the module arbiter performs matching over a pre-defined number of iterations.

9. A two-stage Clos-network switching system, the system comprising:
    input modules having port schedulers that perform port matching operations for the two-stage Clos-network switching system, wherein the port schedulers send grants to input ports that match output ports after receiving grant, and wherein there is at least one port scheduler in each input module; and
    central modules having module schedulers that perform module matching operations for the two-stage Clos-network switching system, wherein the module schedulers receive requests and, in response to the requests, perform module matching, including sending grants to port schedulers, and wherein there is at least one modular scheduler in each central module.

10. The system of claim 9, wherein one input module of the input modules matches with a single central module.

11. The system of claim 9, wherein the module matching comprises weights in selecting matches.

12. The system of claim 11, wherein the weights follow a longest queue-occupancy first policy.

13. The system of claim 9, wherein the input ports comprise virtual output queues.

14. A method for matching in an input-queued Clos network switch, the method comprising:
    receiving a request from an input port at a module arbiter of the input-queued Clos network switch, wherein the module arbiter is part of a second-stage module;
    selecting at the module arbiter a module;
    sending a module grant from the module arbiter to a port scheduler of the input-queued Clos network switch, wherein the port scheduler is part of a first-stage module;
    selecting at the port scheduler a port;
    sending a port grant from the port scheduler to the input port.

15. The method of claim 14, wherein the port is selected only after receiving the module grant.

16. The method of claim 14, wherein selecting at the module arbiter a module comprises selecting the module based on longest queue-occupancy first.

* * * * *

UNITED STATES PATENT AND TRADEMARK OFFICE
CERTIFICATE OF CORRECTION

| | |
|---|---|
| PATENT NO. | : 7,843,908 B2 |
| APPLICATION NO. | : 12/134824 |
| DATED | : November 30, 2010 |
| INVENTOR(S) | : Rojas-Cessa et al. |

It is certified that error appears in the above-identified patent and that said Letters Patent is hereby corrected as shown below:

Title page, item (56), under "Other Publications", in Column 2, Line 13, delete "Thoroughput"" and insert -- Throughput" --.

Page 2, item (56), under "Other Publications" in Column 1, Line 4, delete "Thoroughput" and insert -- Throughput --.

Page 2, item (56), under "Other Publications", in Column 2, Line 11, delete "Dispaching" and insert -- Dispatching --.

Column 1, line 50, delete "scalability" and insert -- scalability. --.

Column 3, line 29, delete "(WMOM)" and insert -- (WMoM) --.

Column 3, line 40, delete "1Q" and insert -- IQ --.

Column 4, line 19, delete "VMC(i,j)" and insert -- VMC(i, j) --.

Column 4, line 61, delete "Sps." and insert -- $S_P$S. --.

Column 9, lines 45-46, in Claim 1, delete "Clos-Network" and insert -- Clos-network --.

Column 9, line 48, in Claim 1, delete "Clos-Network" and insert -- Clos-network --.

Column 10, line 8, in Claim 5, delete "clos-network" and insert -- Clos-network --.

Signed and Sealed this
Seventeenth Day of May, 2011

David J. Kappos
*Director of the United States Patent and Trademark Office*